July 24, 1962  R. R. CARLTON  3,045,502
SAW CHAIN SPROCKET

Filed Aug. 3, 1959  2 Sheets-Sheet 1

INVENTOR.
Raymond R. Carlton
BY
Buckhorn, Cheatham & Blore
ATTORNEYS

July 24, 1962  R. R. CARLTON  3,045,502
SAW CHAIN SPROCKET
Filed Aug. 3, 1959  2 Sheets-Sheet 2
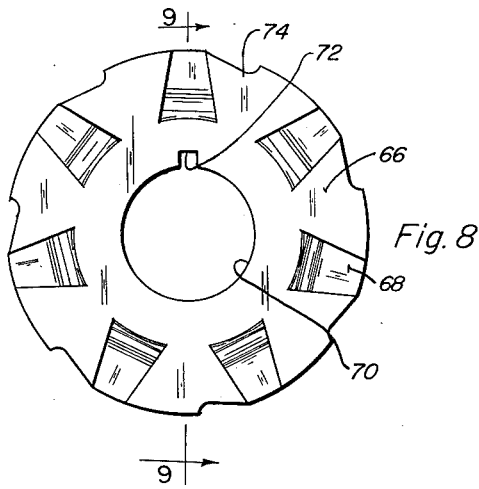
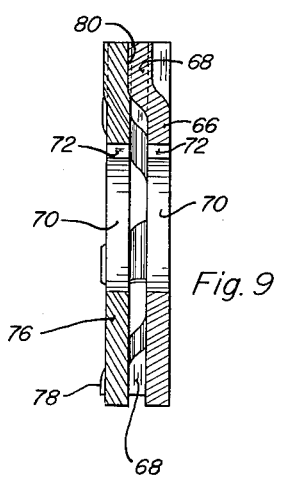
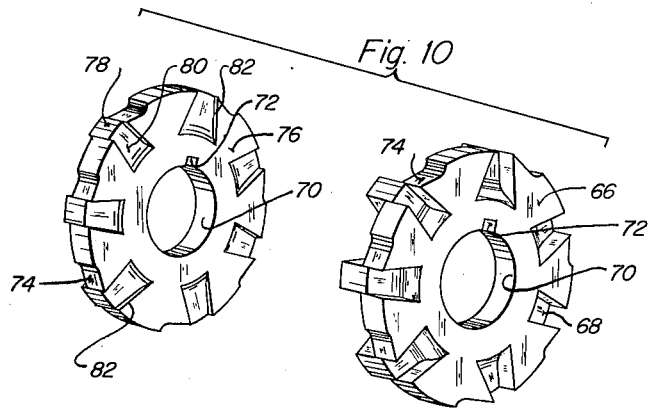
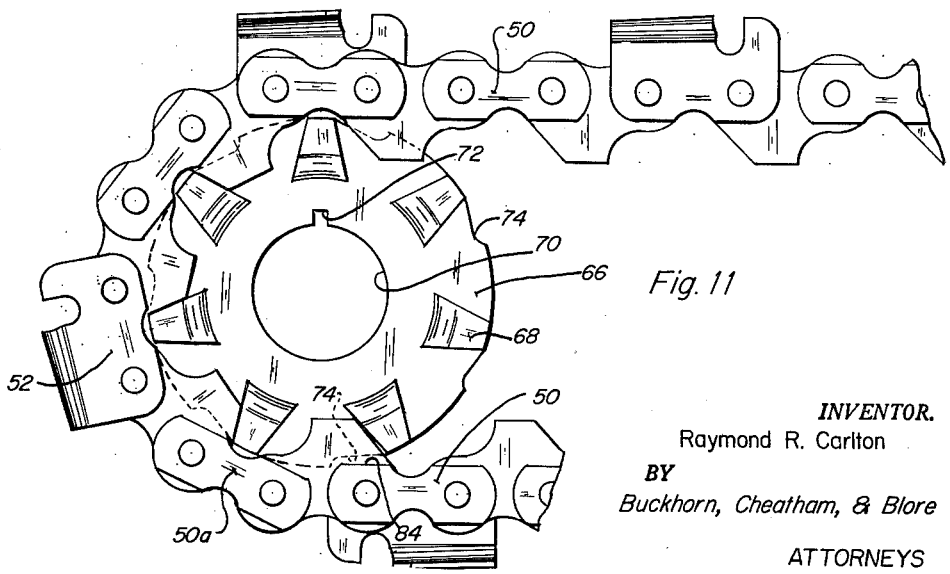
INVENTOR.
Raymond R. Carlton
BY
Buckhorn, Cheatham, & Blore
ATTORNEYS United States Patent Office 3,045,502
Patented July 24, 1962

3,045,502
SAW CHAIN SPROCKET
Raymond R. Carlton, Portland, Oreg., assignor to Omark Industries, Inc., Portland, Oreg., a corporation of Oregon
Filed Aug. 3, 1959, Ser. No. 831,294
17 Claims. (Cl. 74—243)

This invention relates to a saw chain sprocket and more particularly to a sprocket made up of a plurality of members, which can be stamped sheet metal members, suitably secured together.

Sprockets employed for saw chains have for the most part been of cast or forged integral construction having a disc-like body with a plurality of teeth formed on the periphery thereof, the teeth being of substantial axial extent. Such sprockets are difficult to manufacture and to accurately finish and properly heat treat. Also, such sprockets do not provide for guiding the saw chain against movement axially of the sprocket but rely entirely upon the slots between the rails of a conventional saw bar employed on chain saws for guiding the chain, thus resulting in rapid wear upon the saw bar rails adjacent entrance portios of such slot. Also such sprockets support the saw chain upon the ends of the sprocket teeth resulting in noisy operation and rapid wear.

In accordance with the present invention, a sprocket of laminated construction is provided in which the sprocket teeth of a toothed sprocket member are formed by displacing portions of the metal adjacent the periphery of an outer radially extending portion of a sheet metal member axially out of the plane of such radially extending portion by a punching operation. The tooth portions are displaced from such plane a distance which is less than the thickness of the metal of the sprocket member so that the thus formed sprocket teeth are braced in a circumferential direction by the remainder of the outer portion of the sprocket member. The circumferentially spaced sprocket tooth portions preferably extend from the periphery of the sprocket member to a position adjacent a central aperture in the sprocket member and then merge into the inner peripheral portion of the sprocket member by reversely curved portions spaced radially outwardly from the central aperture in such sprocket member so that such tooth portions remain an integral part of the sprocket member.

The toothed sprocket member above referred to may be mounted concentrically upon a hub member and another cooperating sheet metal sprocket member having a radially extending portion may also be mounted upon the hub member so that a radially extending surface of the other sprocket member is in surface contact with radially extending surfaces of the tooth portions displaced from the sprocket member. This leaves circumferentially spaced recesses between the sprocket tooth portions for the reception of drive portions of saw chain drive link plates. The outer portions of such other sprocket member and of the toothed sprocket member form guide portions for the chain which restrict movement of the chain axially of the sprocket. Also the outer peripheral edges of the sprocket members can be employed to provide support surfaces for the side link plates of the chain so that the chain is supported upon the edge surfaces of such members instead of upon the ends of circumferentially spaced sprocket teeth.

One manner of securing the members of such sprocket together is by brazing. The reverse curve portions of the sprocket teeth referred to above, provide an annular space about the hub which can be employed for the reception of a ring of brazing material and upon heating the entire sprocket assembly above described to a temperature above the fuzing point of the brazing material in conjunction with the employment of a suitable flux, the entire structure is brazed into a single unitary assembly.

The hub member referred to may have a longitudinally extending slot therein providing a keyway for the sprocket or alternatively the hub member may be an unslotted continuous annular member. It is also possible to braze a clutch drum member to the other sprocket members in a single brazing operation of the type discussed above. The result is a simple chain saw sprocket structure which is easy to fabricate and manufacture by stamping and brazing operations and which provides guide recesses for receiving the drive elements of a chain saw so as to hold the chain against movement axially of the sprocket and which also supports the side link plates of the chain including the saw or peripheral surfaces to provide smoother operation of the chain.

The cooperating sheet metal sprocket member referred to above may also have portions displaced axially out of the plane of a radially extending portion of such member by a punching operation to provide support portions on said radially extending portion for the sprocket teeth of the toothed sprocket member. Such displaced portions can conform in circumferential spacing and shape to the outer portions of the sprocket teeth of the toothed sprocket member to provide shallow depressions fitting and receiving the outer portions of such teeth. The depressions, thus provide rim portions surrounding and reinforcing such teeth. The result is an interlocking structure particularly suitable for laminated sprockets which do not have the members thereof brazed together, although the two members just described may be brazed together, if desired. Since they are restrained against relative rotation, it is sufficient to hold the two members of the interlocking structure just described against axial separation, for example, by a suitable adhesive or by positioning them between a collar on a shaft or hub member and a nut screw-threaded on such shaft or hub member.

In any of the forms of laminated sprockets of the present invention, somewhat smoother operation of the chain can be accomplished by suitably notching the peripheries of the sheet metal sprocket members where the side link plates including the cutter side link plates initially come in contact with such members during operation of the chain upon the sprocket. Such notches can be formed to reduce the intensity of the impact between said side link plates and the two sprocket members while still providing a sprocket in which the chain is supported on the peripheries of such members at positions spaced circumferentially from such sprocket teeth instead of upon the ends of the sprocket teeth. The general structure of the present sprocket construction can however be employed even with sprockets in which the chain is supported upon the ends of the sprocket teeth.

It is therefore an object of the present invention to provide an improved saw chain sprocket of laminated construction.

Another object of the invention is to provide a laminated sprocket member in which sheet metal members held against axial separation are interlocked against relative rotation by circumferentially spaced portions axially displaced out of the plane of radially extending portions thereof, and in which the axially displaced portions of one of the members constitute sprocket tooth portions.

Another object of the invention is to provide a saw chain sprocket made up of a plurality of sheet metal members in which one of such members has saw tooth portions displaced out of a radially extending portion thereof.

A further object of the invention is to provide an improved method of fabricating saw chain sprockets in which sprocket tooth portions are displaced axially out of a radially extending portion of a sheet metal sprocket member by a stamping operation and the resulting sprocket member is assembled with a cooperating sprocket member to provide support for such tooth portions.

Other objects and advantages of the invention will appear in the following detailed description of preferred embodiments given in connection with the attached drawings of which:

FIG. 8 is a view similar to FIG. 1 on a somewhat larger scale, showing a modified form of sprocket;

FIG. 9 is a vertical section of the sprocket of FIG. 8 taken on the line 9—9 of FIG. 8;

FIG. 10 is an exploded perspective view showing the members of the sprocket of FIGS. 8 and 9; and FIG. 11 is a side elevation of the toothed sprocket member of FIGS. 8 to 10, showing a saw chain in operating position thereon and with the cooperating sprocket member omitted for clarity.

Referring more particularly to the drawings, the sprocket shown in FIGS. 1 to 5 inclusive, includes a hub member 10 which may be of generally annular formation having an internal cylindrical bore, and a slot 14 extending axially of the hub member and completely through the wall of the hub member.

Figure 5:
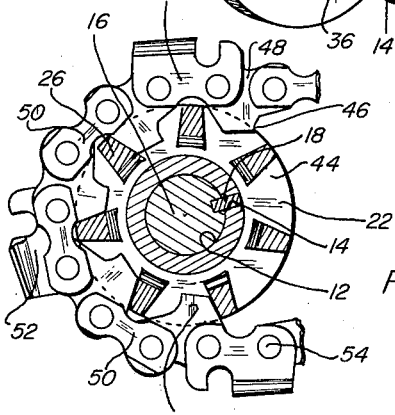
FIG. 5 is a sectional view taken perpendicularly to the axis of the sprocket of FIGS. 1 and 2, showing the sprocket mounted upon a shaft and a portion of a saw chain in elevation and in position upon the sprocket.

As shown in FIG. 5, the bore 12 fits a drive shaft 16 of a chain saw. The sprocket hub is suitably keyed on the shaft 16 by a key 18 which fits a key slot in the shaft and also the slot 14 in the hub member 10. The hub member 10 has a cylindrical outer surface 20 upon which a toothed sprocket member 22 is mounted. The sprocket member 22 has a central aperture 24 with an inner surface conforming to and fitting the surface 20 of the hub member as shown in FIG. 3.

The sprocket member 22 is preferably stamped from sheet metal and has a radially extending portion out of which are stamped a plurality of tooth portions 26 formed by displacing metal of the radially extending portion axially of the sprocket member 22 out of plane of such radially extending portion a distance less than the thickness of the sprocket member. This results in a structure in which the tooth portions overlap the remainder of the annular portion of the sprocket member in an axial direction, as indicated at 28 in FIGS. 2 and 4, so as to be braced circumferentially of the sprocket by the outer portions of the remainder of the sprocket member. The tooth portions 26 extend from the periphery of the sprocket member 22 to a point adjacent but spaced from the aperture 24 of the sprocket member and such tooth portions have reverse curve portions 30 which join the tooth portions to the remainder of the sprocket member and merge into the radially extending portion of the sprocket. In assembling the sprocket of FIGS. 1 to 5, a ring of brazing material 32 may be positioned on the hub member 10 so as to extend through the spaces provided between the hub and the reverse curve portions 30 of the tooth portions 26.

Figure 3:
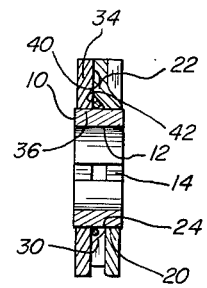
FIG. 3 is a sectional view taken through the axis of the sprocket of FIGS. 1 and 2 during fabrication and showing the parts assembled with a ring of brazing material in position ready for a brazing operation.
Figure 4:
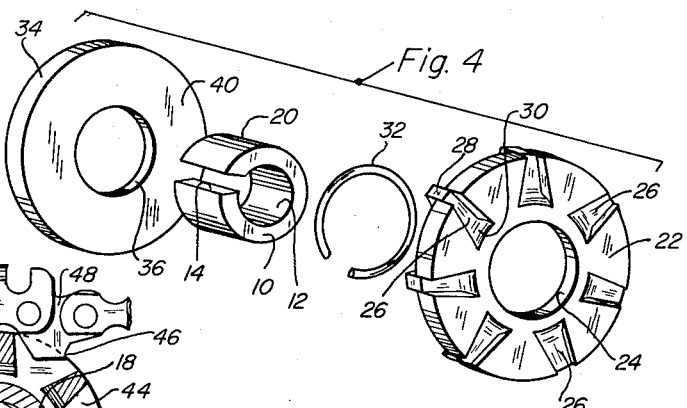
FIG. 4 is an exploded perspective view showing the various members of the sprocket of FIGS. 1 and 2, including the brazing ring shown in FIG. 3.

Cooperating sheet metal sprocket member 34, having a central aperture 36 with an inner surface conforming to and fitting the outer cylindrical surface 20 of the hub member, is also placed upon the hub member as most clearly shown in FIG. 3. Such cooperating sprocket member 34 has a radially extending surface in alignment with and in surface contact with radially extending surfaces of the tooth portions 26 over substantial areas. When the various members are assembled as shown in FIG. 3, with a suitable flux applied to the surfaces thereof which are in contact with each other, the resulting assembly can be heated to fuse the brazing ring 32, for example, in a brazing furnace. The metal of the brazing ring wets the surfaces of the various members and migrates therealong so as to draw into and form thin layers of fused metal between the contacting surfaces of the various members. Upon cooling, the various members are rigidly brazed together into a single unitary structure.

Figure 1:
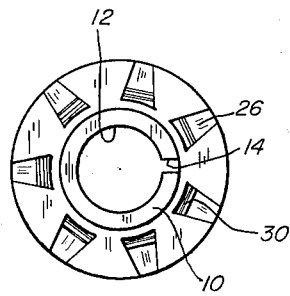
FIG. 1 is an end elevation of one form of completed sprocket in accordance with the present invention.
Figure 2:
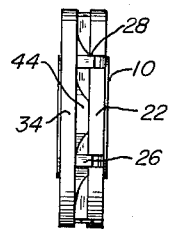
FIG. 2 is a side elevation of the sprocket of FIG. 1.

The resulting laminated sprocket structure is shown in FIGS. 1, 2 and 5. Since the cooperating sprocket member 34 is axially displaced from the sprocket member 22 by reason of the offset or displaced tooth portions 26, circumferentially spaced recesses 44 are provided between the respective tooth portions 26 for the reception of drive elements 46 of the center drive link plates 48 of a conventional saw chain also having side link plates 50 and longitudinally spaced allochiral cutter link plates 52 pivotally connected to the various drive link plates 48 by means of rivets 54, as known in the art. The tooth portions 26 are shaped so that the drive elements of the drive link plates of the saw chain engage and fit the driving surfaces of the tooth portions. It will be apparent that the remainder of the radially extending portion of the sprocket member 22 between the tooth portions 26 and also the radially extending portion of the cooperating sprocket member 34 provide guides for the sides of the drive elements 46 of the chain so as to maintain the chain against axial displacement on the sprocket. Also the side link plates 50 and cutter link plates 52 engage and are supported by the outer peripheral edge surfaces of the sprocket members 22 and 34 instead of being supported on the end surfaces of the sprocket teeth, thus providing for smoother operation of the chain.

Figure 7:
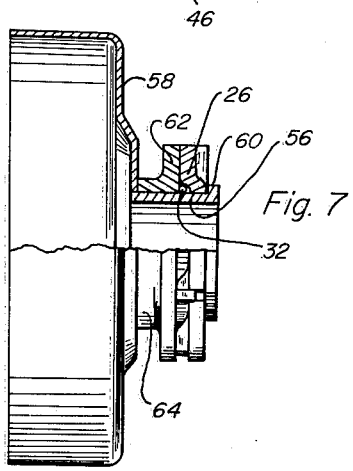
FIG. 7 is a side elevation of the sprocket of FIG. 6 during fabrication with a portion broken away to show parts in section.
Figure 6:
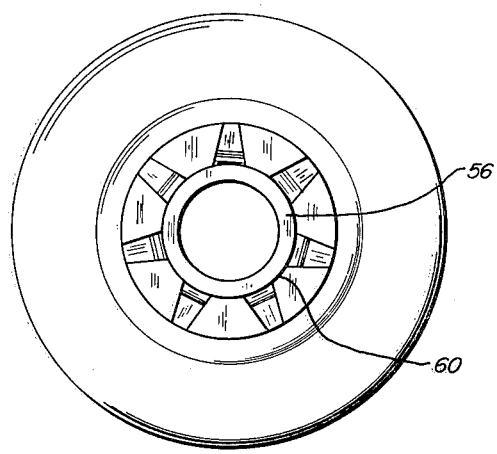
FIG. 6 is a view similar to FIG. 1 showing a modified type of sprocket.

The sprocket assembly of FIGS. 6 and 7 may be similar to the sprocket just described. It may include a hub member 56 which need not be slotted, since a clutch drum 58 is mounted upon the hub and secured thereto. The hub member 56 to FIGS. 6 and 7 may have an annular flange 60 at the end opposite the clutch drum 58. A toothed sprocket member 22, which may be identical with the sprocket member 22 of the FIGS. 1 to 5, is positioned upon the hub member in contact with the flange 60. A ring 32 of brazing material, which may be identical with the ring 32 of FIGS. 3 and 4, may then be placed on the hub member 56. Such brazing ring 32 may be followed by a cooperating sprocket member 62, which differs from the sprocket member 34 of FIGS. 1 to 4 in that it has an axially extending tubular portion 64 which functions as a spacer element for the clutch drum 58 to space such clutch drum axially from the portion of the sprocket which receives the saw chain. The clutch drum 58 is then assembled upon the hub member 56, it being understood that the internal surfaces of the central apertures of the various members mounted upon the hub member 56 are formed to be received upon and fit the outer surface of the hub member 56. The assembly shown in FIG. 7 may then be heated to a brazing temperature as discussed above with respect to the sprocket member of FIGS. 1 to 5, and the result is a unitary sprocket structure having all of the characteristics discussed with respect to the sprocket of FIGS. 1 to 5 and also having, as a unitary portion thereof, a clutch drum 58 which forms part of the drive mechanism of many commercial chain saws. While a separate hub member is useful in holding the members in position relative to each other during the brazing operation, it is apparent that most of the advantages of the forms of the invention shown in FIGS. 1 to 7 will be realized if the apertures in the two sprocket members are made smaller to fit the chain saw shaft so that the hub member extending through the sprocket members is thereby eliminated.

A modified sprocket structure is shown in FIGS. 8 to 11 inclusive, which is particularly suitable for use without a separate hub member, although it will be apparent that the sprocket members of the modified sprocket structure may be mounted upon a hub member, if desired. The sprocket structure specifically shown in FIGS. 8 to 11 is fabricated of two sprocket members only. One sprocket member of such structure is a toothed sprocket member 66 which may be generally similar to the toothed sprocket member 22 of FIGS. 1 to 7 in that it has tooth portions 68 similar to the tooth portions 26 displaced axially out of the plane of a radially extending portion. It differs from the sprocket member 22 by being of somewhat thicker sheet metal for a given type of saw chain and by having a central aperture 70 of a size fitting directly upon a chain saw shaft instead of upon a hub member positioned upon such shaft. The aperture 70 is provided with a keyway 72 and also the periphery of the sprocket member 66 has a plurality of circumferentially spaced notches 74 therein for a purpose discussed below.

The other sprocket member 76 of the modified structure of FIGS. 8 to 11, is similar in shape to the sprocket member 66 and has the same sized central aperture 70 and key way 72 as the sprocket member 66 and also has corresponding circumferentially spaced peripheral notches 74. It also has portions 78 displaced axially out of the plane of a radially extending portion thereof by a punching operation. The axially displaced portions 78 have the same form as the outer parts of the tooth portions of the sprocket member 66 and the displacement of the portions 78 leaves recesses 80 receiving and fitting the sides of the tooth portions 68 having the greatest displacement from the center plane of the radially extending portion of the sprocket member 66. Such recesses provide radially extending rim portions 82 which overlap and engage the edges of such tooth portion to provide an interlocking structure preventing relative rotation of the two sprocket members 66 and 76.

It will be apparent that it is merely necessary to prevent axial separation of the two sprocket members 66 and 76 to provide an operative sprocket structure. Saw chain sprockets are usually held on a chain saw shaft between a collar on such shaft and a nut threaded upon such shaft so that the sprocket of FIGS. 8 to 11 can be supplied as two separate pieces for positioning in operative relation upon the shaft. Conveniently the two sprocket members may be assembled and secured together by any suitable adhesive known to the art, or they can be brazed together to provide a unitary assembly.

In operation of a chain saw, the elements of the chain traveling in the direction of the sprocket and coming into engagement with the sprocket, strike the sprocket with considerable force. This is particularly true of the elements which rest upon peripheral portions of the sprocket to hold the chain at the correct radial distance from the center of the sprocket. With conventional sprockets and chains their function is performed by the side link plates 50 and cutter link plates 52, which are also side link plates, resting upon the ends of the sprocket teeth. The peripheral portions between the tooth portion 68 of the sprocket members 66 and 76 of the sprocket of FIGS. 8 to 11 can be employed for this function and the force with which the side link plates strike such peripheral portions can be minimized by providing the notches 74 referred to above. Such notches preferably conform in shape to the portions of the ends of the side link plates nearest the sprocket and fit such portions as the chain approaches the sprocket tangentially. The initial contact between the side link plates is between the bottom portions of notches 74 and edge portions 84 of the side link plates. These portions approach each other at a relative slow rate relative to the speed of the chain and also any impact is spread over the substantial areas of such portions so that noise and wear is minimized. The side link plates than rock on the bottom portions of the notches 74 to the position of the side link plate 50a of FIG. 11 with the side link plates resting on the bottom portions of the notches so as to be spaced from the outer ends of the tooth portions 68. It will, however, be apparent that the sprockets of FIGS. 1 to 7 can also be provided with the notches 74, but the major advantages of the present invention will be realized even if the tooth portions 68 of the several forms of the sprocket shown are of sufficient radial length relative to the peripheral portions of the sprocket members, that the side link plates of the saw chain are supported on the sprocket tooth ends as is the case with conventional sprockets. One major advantage is that the various sprocket members of the present invention can be each formed out of a sheet metal strip or plate by a single stroke of a punch press so that the cost of a sprocket of the present invention is a small fraction of prior art saw chain sprockets.

I claim:

1. A saw chain sprocket comprising a sheet metal toothed sprocket member having a radially extending portion providing surface portions positioned in a radial plane, said radially extending portion having radially extending sprocket tooth portions displaced axially of said member out of said radially extending portion a distance less than the thickness of said metal, said sprocket tooth portions being circumferentially spaced from each other and having parts of said radially extending portion positioned between and in overlapping contact with said tooth portions, said tooth portions being radially spaced outwardly from said hub member and extending to the periphery of said sprocket member and having their outer portions parallel to said plane, a second sheet metal sprocket member positioned concentrically with said toothed sprocket member and having a central aperture and radially extending portions in surface contact with said tooth portions and surface portions parallel to said plane positioned between said tooth portions, said members being secured together to form said sprocket and provide saw chain drive link receiving recesses between said tooth portions and between said surface portions, said members having similar outer peripheral edge surfaces and having notches in said surfaces for receiving the portions of the side link plates of a saw chain which first engage said sprocket when said chain is operated on said sprocket.

2. A saw chain sprocket comprising a hub member, a sheet metal toothed sprocket member mounted concentrically upon said hub member and having a radially extending portion and an inner surface fitting said cylindrical surface, said portion having sprocket teeth portions displaced axially of said hub member out of said radially extending portion, said tooth portions being circumferentially spaced from each other around said radially extending portion and each extending parallel to said radially extending portion and radially inwardly from the periphery of said radially extending portion and having a reverse curve portion at its radially inner end spaced from said hub member and merging into said radially extending portion, a second sprocket member mounted concentrically upon said hub member and having an inner surface fitting said cylindrical surface, said second sprocket member having radially extending portions in surface contact with said tooth portions and defining with said toothed sprocket member a series of recesses between said tooth portions for the reception of saw chain drive elements, said members being secured together to form said sprocket.

3. A saw chain sprocket comprising a hub member having a cylindrical outer surface, a sheet metal toothed sprocket member mounted concentrically upon said hub member and having a radially extending annular portion and an aperture fitting said cylindrical surface, said portion having sprocket teeth portions displaced axially of said hub member out of said radially extending portion a distance less than the thickness of said radially extending portion, said tooth portions being circumferentially spaced around said radially extending portion and having parts of said radially extending portion positioned between said tooth portions, said tooth portions each extending parallel to said radially extending portion radially inwardly from the periphery of said radially extending portion and having a reverse curve portion at its radially inner end spaced from said hub member and merging into said radially extending portion, a second sprocket member mounted concentrically upon said hub member and having an aperture fitting said cylindrical surface, said second sprocket member having radially extending portions in surface contact with said tooth portions and defining with said toothed sprocket member a series of recesses between said tooth portions for the reception of saw chain drive elements, and a third member mounted concentrically upon said hub member and having a concentrically disposed cup-shaped clutch drum integral therewith, said members being secured together to form said sprocket.

4. A sprocket, comprising a sheet metal toothed sprocket member having a radially and circumferentially extending portion, said member having radially extending tooth portions disposed axially of said member in one axial direction only out of said radially extending portion, a second sprocket member having a radially and circumferentially extending portion and having displaced portions displaced axially of said second member in one axial direction only out of the radially extending portion of said second member to provide radially extending recesses receiving and fitting said tooth portions of said toothed member when said members are mounted in concentric relation with respect to each other to provide an interlocking structure preventing relative rotation of said members.

5. A sprocket, comprising a sheet metal toothed sprocket member having a radially and circumferentially extending portion, said member having radially extending tooth portions displaced axially of said member out of said radially extending portion a distance less than the thickness of said metal, a second sprocket member having a radially and circumferentially extending portion and having displaced portions displaced axially of said second member out of the radially extending portion of said second member to provide radially extending recesses receiving and fitting said tooth portions of said toothed member when said members are mounted in concentric relation with respect to each other to provide an interlocking structure preventing relative rotation of said members, said recesses being of less axial depth than the axial displacement of said toothed portions to provide recesses to receive drive portions of saw chain central drive links between said toothed portions and between said radially extending portions.

6. A sprocket, comprising a sheet metal toothed sprocket member having a radially and circumferentially extending portion, said member having radially extending tooth portions displaced axially of said member out of said radially extending portion a distance less than the thickness of said metal, a second sprocket member having a radially and circumferentially extending portion and having displaced portions displaced axially of said second member out of the radially extending portion of said second member to provide radially extending recesses receiving and fitting said tooth portions of said toothed member when said members are mounted in concentric relation with respect to each other to provide an interlocking structure preventing relative rotation of said members, said recesses being of less axial depth than the axial displacement of said toothed portions to provide recesses to receive drive portions of saw chain central drive links between said toothed portions and between said radially extending portions, said members having similar outer peripheral surfaces for engaging and supporting the side link plates of said saw chain, said surfaces having notches therein for receiving the portions of said side link plates which first engage said sprocket during operation of said chain upon said sprocket.

7. The method of making a sprocket comprising displacing sprocket tooth portions axially from an outer radially extending portion of a sheet metal member a distance less than the thickness of such radially extending portion to form a toothed sprocket member having tooth portions integral with the remainder of said sprocket member and each having a radially extending surface displaced axially from the remainder of said radially extending portion, positioning a second sprocket member having radially extending surfaces with said surfaces of said second member in surface contact with said radially extending surfaces of each of said tooth portions and concentric with said toothed sprocket member, and securing said members together.

8. The method of making a sprocket comprising displacing sprocket tooth portions axially from an outer radially extending portion of a sheet metal member a distance less than the thickness of such radially extending portion to form a toothed sprocket member having tooth portions integral with the remainder of said sprocket member and each having a radially extending surface displaced axially from the remainder of said radially extending portion, mounting said member concentrically upon a metal hub member, mounting a second sheet metal sprocket member having radially extending surfaces upon said hub member concentric with said toothed sprocket member and with said radially extending surfaces of said second member in surface contact with said radially extending surfaces of said tooth portions, and brazing all of said members together to provide a unitary sprocket structure.

9. The method of making a sprocket comprising displacing sprocket tooth portions axially from an outer radially extending portion of a sheet metal member by a stamping operation to provide tooth portions each having a radially extending surface displaced axially from and integrally joined to the inner portion of said member by a reversely curved portion, mounting said member upon a metal hub member, mounting a ring of brazing material on said hub interiorly of said reverse curved portions, mounting on said hub member a second sheet metal sprocket member having radially extending surfaces with said radially extending surfaces of said second member in surface contact with said radially extending surfaces of said tooth portions, and heating the resulting assembly to braze all of said members together and provide a unitary sprocket structure.

10. The method of making a saw chain sprocket comprising displacing sprocket tooth portions axially from an outer radially extending portion of a sheet metal member by a stamping operation to provide tooth portions integral with the remainder of said member each having a radially extending surface displaced axially from the remainder of said radially extending portion, mounting said member upon a metal hub member, mounting a brazing ring on said hub member radially inwardly of said tooth portions, mounting on said hub member a second sheet metal sprocket member having radially extending surfaces with said radially extending surfaces of said second member in surface contact with said radially extending surfaces of said tooth portions, mounting a third sheet metal annular member having a clutch drum formed integrally therewith concentrically upon said hub member, and heating the resulting assembly to braze all of said members together to provide a unitary sprocket structure.

11. The method of making a sprocket which comprises displacing sprocket tooth portions axially in one axial direction only out of an outer radially and circumferentially extending portion of a sheet metal member to form a sprocket member having tooth portions integral with the remainder of said sprocket member, and displacing portions axially in one axial direction only out of an outer radially and circumferentially extending portion of a second sheet metal member a distance less than the axial displacement of said tooth portions to form recesses of less depth than the said axial displacement of said tooth portions fitting and receiving portions of said tooth portions to form a circumferentially interlocked structure when said members are engaged with each other in concentric relation, and securing said members together in said concentric relation.

12. The method of making a sprocket which comprises displacing sprocket tooth portions axially out of an outer radially and circumferentially extending portion of a sheet metal member a distance less than the thickness of said metal to form a sprocket member having tooth portions integral with the remainder of said sprocket member, displacing portions axially out of an outer radially and circumferentially extending portion of a second sheet metal member a distance less than the axial displacement of said tooth portions to form recesses of less depth than the said axial displacement of said tooth portions fitting and receiving portions of said tooth portions to form a circumferentially interlocked structure when said members are engaged with each other in concentric relation, and securing said members together in said concentric relation.

13. A saw chain sprocket member comprising a sheet metal member having a radially and circumferentially extending portion providing surface portions positioned in a radial plane, said member having radially extending tooth portions displaced axially of said member out of said radially extending portion a distance less than the thickness of said radially extending portion, said tooth portions being circumferentially spaced from each other and having parts of said radially extending portion positioned between and in overlapping contact with said tooth portions, said tooth portions extending to the periphery of said sprocket member and having surfaces on their outer portions parallel to said plane.

14. A saw chain sprocket member comprising a sheet metal member having a central aperture and a radially extending portion providing surface portions positioned in a radial plane, said member having radially extending tooth portions displaced axially of said member out of said radially extending portion a distance less than the thickness of said radially extending portion, said tooth portions being circumferentially spaced from each other and having parts of said radially extending portion positioned between and in overlapping contact with said tooth portions, said tooth portions being radially spaced outwardly from said aperture and extending to the periphery of said sprocket member and having their axially outer portions parallel to said plane.

15. A sprocket comprising a toothed sheet metal sprocket member having a central aperture and a radially extending portion providing surface portions positioned in a radial plane, said member having radially extending sprocket tooth portions displaced axially of said member out of said radially extending portion a distance less than the thickness of said radially extending portion, said tooth portions being circumferentially spaced from each other and having parts of said radially extending portion positioned between and in overlapping contact with said tooth portions, said tooth portions extending to the periphery of said sprocket member and having surfaces on their outer portions parallel to said plane, a second sprocket member positioned concentrically with said toothed sprocket member and having radially extending portions parallel to said plane and in surface contact with said tooth portions, and means for securing said sprocket members together.

16. A sprocket comprising a toothed sprocket member having a central aperture and a radially extending portion providing surface portions positioned in a radial plane, said member having radially extending sprocket tooth portions displaced axially of said sprocket member out of said radially extending portion a distance less than the thickness of said radially extending portion, said sprocket tooth portions being circumferentially spaced from each other and having parts of said radially extending portion positioned between and in overlapping contact with said tooth portions, said tooth portions being radially spaced outwardly from said aperture and extending to the periphery of said sprocket member and having their axially outer portions parallel to said plane, a second sprocket member positioned concentrically with said toothed sprocket member and having radially extending portions in surface contact with said tooth portions and surface portions parallel to said plane positioned between said tooth portions, said members being secured together to form said sprocket and provide recesses between said tooth portions having sides provided by said tooth portions and said surface portions.

17. A sprocket comprising a hub member, a toothed sprocket member mounted concentrically upon said hub member and having a radially extending portion providing surface portions positioned in a radial plane, said radially extending portion having radially extending sprocket tooth portions displaced axially of said hub member out of said radially extending portion a distance less than the thickness of said radially extending portion, said sprocket tooth portions being circumferentially spaced from each other and having parts of said radially extending portion positioned between and in overlapping contact with said tooth portions, said tooth portions being radially spaced outwardly from said hub member and extending to the periphery of said sprocket member and having their axially outer portions parallel to said plane, a second sprocket member mounted concentrically upon said hub member and having radially extending portions in surface contact with said tooth portions and surface portions parallel to said plane positioned between said tooth portions, said members being brazed together to form said sprocket and to provide recesses between said tooth portions, said surface portions providing the sides of said recesses and said radially extending portions of said sprocket members having similar outer peripheral edge surfaces.

References Cited in the file of this patent

UNITED STATES PATENTS

| | | |
|---|---|---|
| 594,219 | Tredwell | Nov. 23, 1897 |
| 1,199,455 | Dunlap | Sept. 26, 1916 |
| 1,583,221 | Carlson | May 4, 1926 |
| 2,047,820 | Cramer | July 14, 1936 |
| 2,275,177 | Crans | Mar. 3, 1942 |
| 2,884,798 | Wilson | May 5, 1959 |

FOREIGN PATENTS

| | | |
|---|---|---|
| 903,963 | France | Feb. 12, 1945 |